Jan. 31, 1967 M. G. HUNTINGTON 3,301,320
APPARATUS FOR CONTAINING HOT METAL-ATTACKING GASES SUCH AS
HYDROGEN AND HYDROGEN SULPHIDE UNDER PRESSURE WHEREBY
CHEMICAL AND THERMAL STRESSES ARE
SEPARATED FROM HOOP STRESS
Filed Aug. 7, 1964
FIG. 1
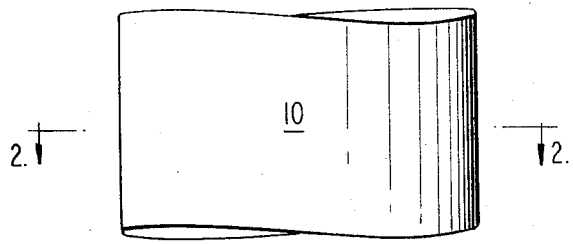
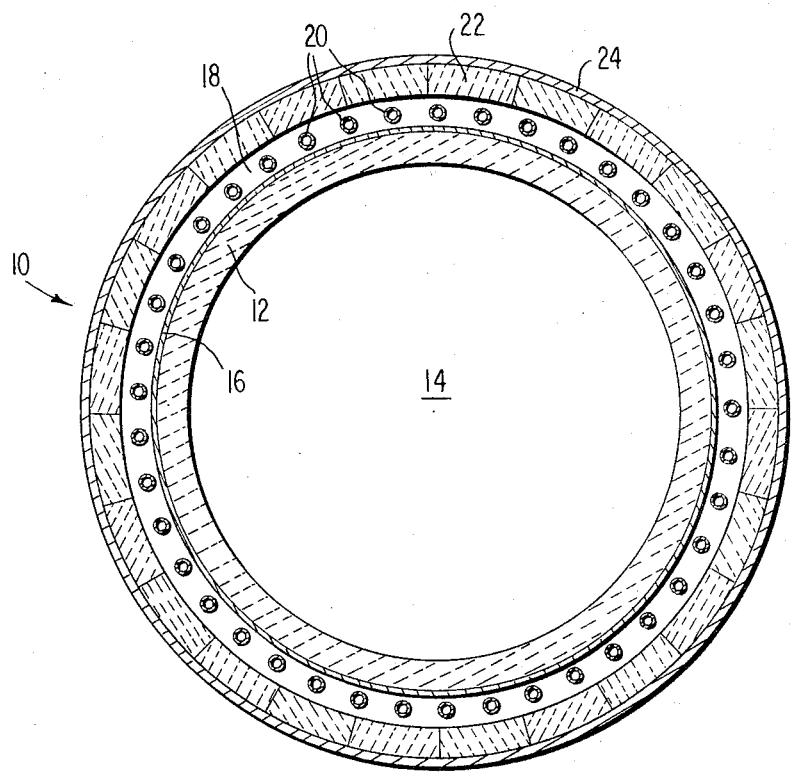
FIG. 2
INVENTOR.
MORGAN G. HUNTINGTON
BY
Sughrue, Rothwell, Mion, Zinn & Macpeak
ATTORNEYS 3,301,320
APPARATUS FOR CONTAINING HOT METAL-ATTACKING GASES SUCH AS HYDROGEN AND HYDROGEN SULPHIDE UNDER PRESSURE WHEREBY CHEMICAL AND THERMAL STRESSES ARE SEPARATED FROM HOOP STRESS
Morgan G. Huntington, Galesville, Md., assignor to Pyrochem Corporation, Salt Lake City, Utah, a corporation of Utah
Filed Aug. 7, 1964, Ser. No. 388,176
6 Claims. (Cl. 165—134)

The present invention relates to improvements in gas containing vessels and ducts, and more particularly to an apparatus for containing hot hydrogen, hydrogen sulphide and other metal-attacking gases under pressure, which separates thermal and chemical stresses from hoop stress so that each type of stress is confined to the member most suited to resist such stress.

While the apparatus of the present invention may be utilized whenever it is desired to contain hot metal-attacking gases, it has been found to be particularly useful for containing hot hydrogen and hydrogen sulphide under pressure in the process described in my United States patent application Serial No. 353,458, filed March 20, 1964.

In many chemical and metallurgical processes, certain metal-attacking gases must be contained and/or transported at high temperature and at substantial pressures. The wall structure of a containing vessel for these gases must be capable of withstanding the heat and pressure of such gases as well as the embrittling or corrosive action of these gases. Since thermal stress is additive to hoop stress and because chemical stress may be unpredictable, the principal object of this invention is to isolate hoop stress so that it alone may be exerted in one selected member.

A particular problem arises when the gases to be contained are metal-attacking gases, such as hot hydrogen or hydrogen sulphide, inter alia. In conventional metals (for example, carbon steel) are used alone as a single containing wall, the wall will become brittle from exposure to the metal-attacking properties of the gases, and will eventually fail, even though the code for fired pressure vessel be scrupulously observed. If, on the other hand, the single wall is made from a material which is resistant to embrittlement by such gases, it would be expensive and extremely difficult to fabricate a vessel strong enough to withstand even moderately high pressures and temperatures of the gases to be contained without failing.

In view of the foregoing, it is an object of this invention to provide an improved multi-walled structure for containing hot metal-attacking gases under pressure wherein the chemical wall will not be subjected to hoop stress and wherein the pressure wall will not be subjected to thermal stress nor become embrittled by chemical attack.

Other objects of the invention will be pointed out in the following description and claims and illustrated in the accompanying drawing, which discloses, by way of of example, the principle of the invention and the best mode which has been contemplated of applying that principle.

In the drawing:

FIGURE 1 is an elevation view, partly broken away, of a metal-attacking gas containing vessel embodying the present invention; and FIGURE 2 is a sectional view of the container of FIGURE 1 taken along the line 2—2 thereof.

Referring now to the drawings, a gas containing vessel 10 is shown in the form of a column having a plurality of concentric walls. Suitable pressure or gas containing seals or closures, not shown, may be provided for the ends of the vessel. See my prior Patents 3,083,471, 3,106,521 and 3,107,985. The column includes an inner thermal insulator lining 12 whose inner wall defines a chamber 14 for containing hot gases. Surrounding the inner refractory insulator lining 12 is a shell 16 which is made of an impervious material that is resistant to embrittlement by the particular gases to be contained, for example, the special stainless steel alloys set forth in "Chemical Engineers' Handbook," Perry, Third edition, p. 1526 et seq.

In order to counteract and effectively balance the outwardly acting pressure of the hot gases in the chamber 14 on the shell 16 (to prevent the shell from bursting), a jacket 18 is provided around the shell. The jacket is filled with a suitable gas (which is chemically non-reactive in respect to the metal-attacking gas) at a pressure equal to or slightly greater than the pressure of the hot metal-attacking gases contained in the chamber 14. When the jacket is so filled, the pressures on the inner and outer surfaces of the embrittlement-resistant shell 16 will be substantially equal, and the impervious chemical shell will not burst. Thus, shell 16 is subjected to thermal stress and the chemically attacking gases and is resistant to both, while the hoop stress is transferred to the outer shell 24.

The otherwise impervious chemical shell 16 may be deliberately perforated at random with a few holes, not shown, usually smaller than $\frac{1}{16}$ inch in diameter so that the inner shell cannot be inadvertently overstressed. Diffusion of hydrogen sulphide into the outer annular space can be overcome, for example, by supplying cold hydrogen or methane (when such minor dilution is not objectionable) through the small perforations to the annular space 18 at a rate sufficient to overcome the diffusion of hot gases from within.

A plurality of heat exchange tubes 20 may be disposed within the jacket 18 for circulating a suitable cooling liquid. The tubes thus function to remove heat from the outer gas-filled annular space. As can be seen, the fluid-cooled jacket serves the dual function of balancing the pressure on the embrittlement-resistant shell 16, and removing heat from between the inner and outer column walls.

Surrounding the gas-filled jacket 18 is an outer thermal insulating lining 22, and against the outer insulating lining is a surrounding pressure shell 24 made of steel or some other suitable impervious high-strength material. Since the pressure shell 24 is protected from heat and from metal-attacking gases, it will be subjected almost entirely to hoop stress created by the radially outward acting pressure from the jacket 18, and must be made strong enough to withstand this stress only.

As can be seen from the foregoing, the apparatus of the present invention provides a means for effectively containing hot, metal-attacking gases at any required pressure by two means: (a) preventing diffusion of the contained inner gases by an impervious shell (except possibly for a few small perforations) and (b) by removing heat from the annular gas-filled space 18.

Although the container of this invention has been described as being cylindrical, it should be understood, of course, that it could be any suitable shape.

Obviously, many modifications and variations of the present invention are possible in the light of the above teachings. It is, therefore, to be understood, that within the scope of the appended claims, the invention may be practiced otherwise than as specifically described.

What is claimed is:

1. Apparatus for containing metal-attacking gases such as hydrogen and hydrogen sulphide comprising:

a wall structure defining a chamber for containing gases;
said wall structure including an inner shell of material which is resistant to embrittlement by the gases to be contained in said chamber;
an outer shell surrounding said inner shell and defining therebetween a jacket filled with a suitable gas at a pressure which is at least substantially equal to the pressure of the metal-attacking gases contained within said inner shell and
at least one tube disposed in said jacket for carrying a cooling fluid.

2. A container for holding hot, metal-attacking gases at any desired pressure, comprising:
an inner refractory insulating lining defining a chamber for containing the hot, metal-attacking gases;
the shell of material which is resistant to embrittlement by the gases to be contained by said chamber surrounding said inner refractory insulating lining;
an internally insulated pressure shell spaced from and surrounding said shell of embrittlement-resistant material to define a jacket adapted to be filled with a fluid to a pressure which is substantially equal to the pressure of the gas to be contained by said container, said pressure shell being strong enough to withstand the pressure created by said gas in said jacket and heat exchange tubes disposed within said jacket for carrying a cooling fluid.

3. The container according to claim 2, wherein said pressure shell is internally insulated by means of an outer refractory lining disposed adjacent the interior surface of said pressure shell.

4. A container according to claim 2, wherein the said shell of embrittlement-resistant material is perforated to prevent it from being inadvertently overstressed.

5. A container according to claim 4, and further comprising means for supplying non-reacting gas into said jacket at a rate sufficient to overcome diffusion of the interior gases through the perforations.

6. An apparatus for containing hot, metal-attacking gases such as hydrogen and hydrogen sulphide under pressure whereby chemical and thermal stresses are separated from hoop stress, comprising:
an inner refractory insulating lining defining a chamber for containing gases;
a shell of material which is resistant to embrittlement by the gases to be contained by said chamber, surrounding said inner refractory insulating lining;
an outer refractory insulating lining spaced from and surrounding said shell of embrittlement-resistant material to define a jacket adapted to be filled with a fluid to a pressure which is substantially equal to the pressure of the gas to be contained by said chamber; a plurality of heat exchange tubes disposed within said jacket for carrying a cooling fluid;
said shell of embrittlement-resistant material having a plurality of perforations therein for preventing overstressing thereof and
a pressure shell surrounding said outer refractory insulating lining, said pessure shell being strong enough to withstand the pressure created by the gas in said jacket.

References Cited by the Examiner
UNITED STATES PATENTS

| | | | |
|---|---|---|---|
| 1,714,948 | 4/1929 | Coffin | 165—136 X |
| 2,243,427 | 5/1941 | Kleffel | 165—134 X |
| 2,345,204 | 3/1944 | Lodwig | 220—9 X |
| 2,631,015 | 3/1953 | Probst | 165—133 X |
| 2,797,297 | 6/1957 | Nihlen | 165—134 X |
| 3,175,958 | 3/1965 | Bourgarde | 165—136 X |
| 3,236,300 | 2/1966 | Chave et al. | 165—136 |

FOREIGN PATENTS 764,007    2/1934    France.

MEYER PERLIN, *Primary Examiner.*

ROBERT A. O'LEARY, *Examiner.*

A. W. DAVIS, *Assistant Examiner.*